Jan. 13, 1970  P. D'ARAGON  3,489,396

STREAM WATER AERATOR

Filed March 14, 1968

Jan. 13, 1970  P. D'ARAGON  3,489,396
STREAM WATER AERATOR
Filed March 14, 1968  2 Sheets-Sheet 2

United States Patent Office 3,489,396
Patented Jan. 13, 1970

3,489,396
STREAM WATER AERATOR
Paul D'Aragon, 525 Stuart, Outremont 8, Quebec, Canada
Filed Mar. 14, 1968, Ser. No. 713,085
Int. Cl. B01f 3/04
U.S. Cl. 261—25                                5 Claims

ABSTRACT OF THE DISCLOSURE

The system of aeration of stream waters in situ is based on Bernoulli's theorem, the waters are made to travel through a pipe-like affair, constructed like a venturi, so that the waters are made to flow through a slot at a speed sufficient to create a vacuum in said slot, and there suck in atmospheric air from air ejectors. The air is ejected with the waters and is kept in contact with said waters for a time by the use of cantilever aprons located at the upper exit end of the venturi-like affair, thereby producing an aeration of the waters.

Figure 1:
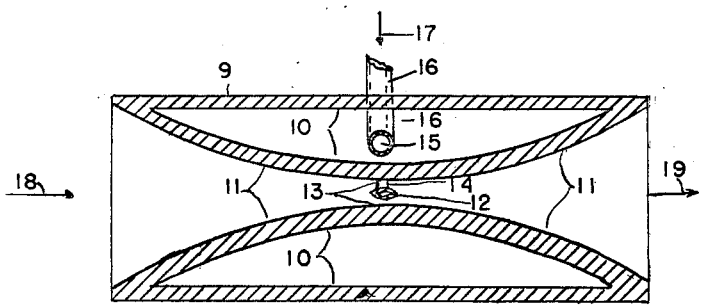

As no power is used, except that provided by the natural flow of the stream waters, it makes the system entirely different from those using outside power sources.

---

The stream water aerator has for aim the full automatic aeration of the waters of streams, the power necessary for the said aerator being supplied by the current of the stream itself, no motor of any kind being necessary.

The aim of the aeration of streams, is to supply to the waters, by dissolution, oxygen which destroy, by oxidation, most pollutants, and also helps living organisms whose life depends on such dissolved oxygen.

The aeration of waters by my aerator is possible in all streams where the currents of said streams have a certain minimum speed. I believe that speeds of one mile and more per hour should be a minimum.

The aerators should be calculated for the minimum speeds, speeds which occur at periods, depending on the location, and generally in winter. The aeration, as it is desirable, should be continuous the year around.

The injection of air in water, at a given depth, necessarily requires a pressure which is a function of said depth. The power necessary to inject a definite quantity of air per unit of time to said depth can be easily calculated.

From the standpoint of aeration only, air injected at depth will be more efficient than air injected at a shallower depth, as the time of contact, and also the pressure will be more effective.

The aerator is essentially a conduit which will be laid in the waters, at right angle to the flow of the current, and necessarily where the stream is relatively narrow and the current the strongest.

The said conduit is such, that the waters are free to enter it along all its length, then flow between walls which gradually converge together to form a slot, and then gradually diverge, so that the waters entering the conduit gradually increase in speed, to a maximum in the said slot, and then gradually diminish in speed towards the exit, like in a venturi.

If, then, we produce a sufficient speed in the said slot, a pressure lower than that of the atmosphere can be created in the said slot, and air can be drawn by a partial vacuum, if a conduit, open to the atmosphere, has a properly shaped and oriented end in the said slot.

The quantity of air which can be so drawn, and at the ejection from the aerator be compressed to the pressure equal to that of the column of water overlying it, is absolutely dependent of the energy supplied by the moving water of the stream.

Being given a height H of entry of the conduit, or mouth of the aerator, the speed $s$ of the water flowing in it, per foot of length of the areator, the power available will then be, $H \times s \times 62.4$, divided by 550, equal HP available.

For the pressure at which the air will be compressed, its depth in water, the volume of air which can be compressed per unit of time can be calculated.

Due to the great amount of water compared to that of the compressed air, the compression will be isothermal.

Necessarily, there will be losses by friction.

If we assume a speed $s$ in feet per second at the entry, and that all the energy of the flowing water is absorbed, it will cause a difference in height of $s$ feet between the entry and the exit of the waters on the aerator.

For the purpose of construction and erection, the aerators should all be of the same dimensions. They could be prefabricated of certain dimensions.

Depending on the depth of the stream, several aerators could lie one above the other, being joined together by convenient joints, the same applies to the aerators lengthwise.

The aerators can be made of suitable materials, economy being the sole guide; concrete, plastics, rubber, etc., can all be used, alone or in combinations.

As the time of contact of the air with the water is important, at the exit end, a light cantilever, apron like, with the underside corrugated, should be emplaced horizontally at the upper end of the said exit, thereby causing a cushion of compressed air in contact with the exiting waters.

The air ejector should be such that the air is injected in the water in a series of small jets instead of concentrated larger jets.

It is emphasized, that only so much air can be ejected for given conditions, as otherwise the air will temporarily block the flow of the waters, causing hammering. A continuous smooth flowing of the air and the waters is a prerequisite.

Figure 2:
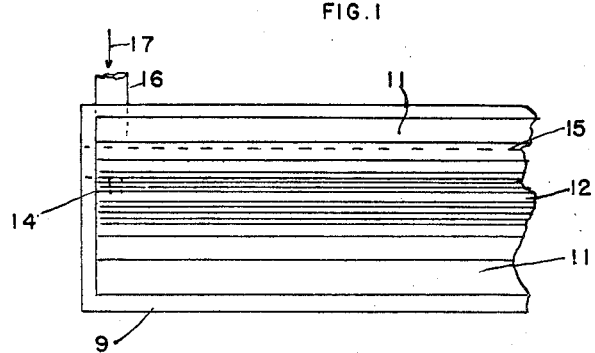
Figure 3:
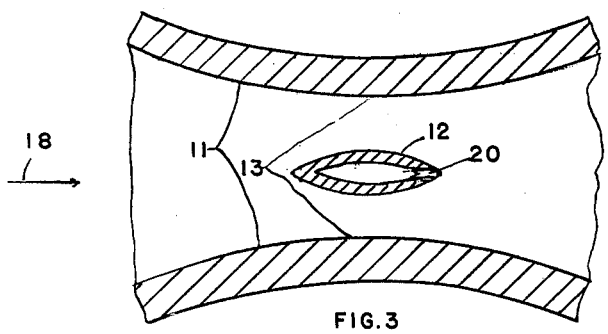
Figure 4:
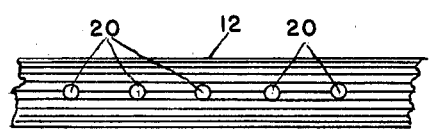
Figure 8:
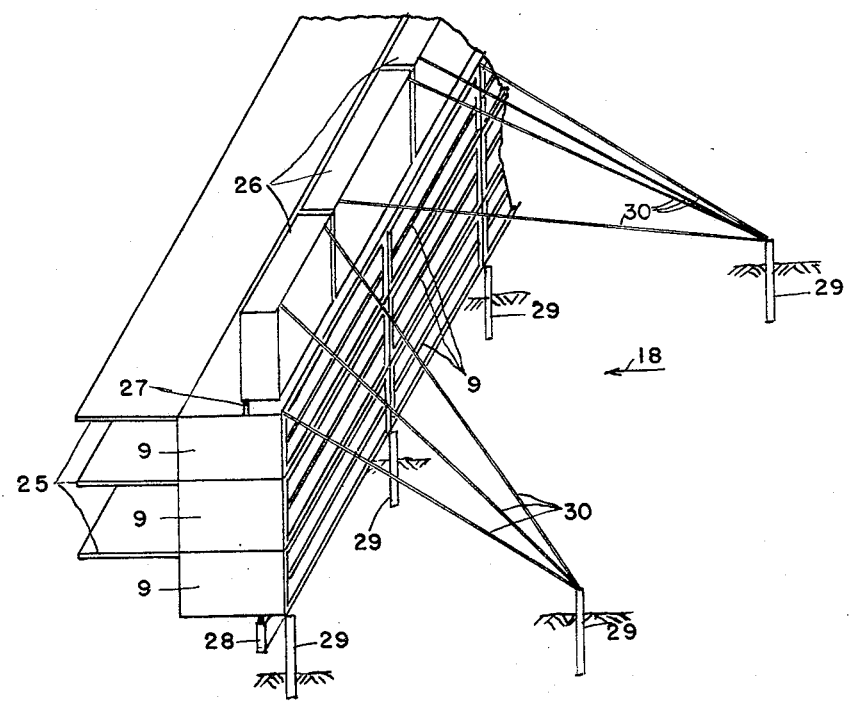
Figure 5:
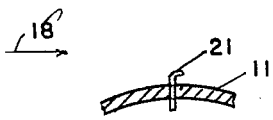
Figure 6:
Figure 7:
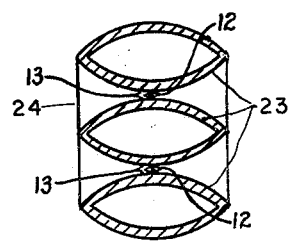

Now, to have a better description of the aerator, reference will be had to the joined drawings, in which we see:

FIGURE 1, a vertical cross-section of the aerator.
FIGURE 2, a side view of the aerator.
FIGURE 3, an enlarged section of the slot, showing a preferred type of air ejector.
FIGURE 4, a front view of the air ejector shown in section in FIGURE 3.
FIGURES 5 and 6, sections of other types of air ejectors.
FIGURE 7, pipe-like sections of the aerators, when aerators lie one above the other.
FIGURE 8, a general view of a dam made of a series of aerators and a possible way of anchorage.

In FIGURE 1, we have an aerator 9, composed of two similarly shaped hollow pieces 10, with the inside properly shaped walls 11.

An air ejector 12 is located in the slot or throat 13 of the aerator 9. The air ejector 12 is, at convenient places connected by pipes 14, which also serve as supports, to a pipe 15, which is also, at places connected to a pipe 16, open at its upper end to the atmosphere, so that atmospheric air is free to enter in said pipe 16, as per arrow 17.

Water from the stream in which the aerator 9 is used, enters as per arrow 18, and exits with the air as per arrow 19.

In FIGURE 3, we see an enlarged section of the air ejector 12, located in the slot 13 of the aerator 9, with holes 20 located on the exit side of the aerator 9.

FIGURE 4 shows the equal spacing of the small holes 20 by which atmospheric air is sucked in the waters by the partial vacuum created by the speeding waters in the said slot 13 of the aerator 9.

In FIGURE 5, instead of holes 20, we have here a series of small curved and properly shaped and oriented small tubes 21 as air ejectors, and in FIGURE 6, we have a properly shaped depression with a series of holes as air ejectors.

As in most instances, there will be aerators lying one above the other, except for the bottom and top ones, and not necessarily, the main components of the aerators could be made pipe like, with their outside properly shaped, as in 23. They would be joined together, in convenient lengths by end plates 24, the joints not shown. The air ejectors 12 would lie in the slots 13 formed by two adjacent pipe like components 23.

It is to note, that if concrete is used in making pipe-like pieces as 23 in FIGURE 7, the concrete should be impervious.

Wear plates, not shown, made of a metal or, preferably with a suitable rubber compound or plastic, should be used on the inside surfaces of the slot 13, and on each side of the said slot for a distance as the speeding waters may entrain some muds which may wear said slot.

It is equally to note, that except for holes facing each other in the end plates 24, said holes serving to join sections of the aerators 9 together, a convenient hole can be made in the end plates 24, and the hollow sections 23 can very well serve as air conduits instead of pipe 15, as in FIGURES 1 and 2.

A convenient gasket, not shown, being there provided in joining the said end plates of the aerators.

In FIGURE 8, we show a general view of a "floating" dam composed of a series of aerators 9, with cantilever aprons 25, located at the upper end of the exit of the aerators 9, the underside of said aprons 25, being corrugated, not shown, with the said corrugations lying at right angle to the flow of the waters.

To force nearly all the water from the stream to flow through the aerators 9, hollow, box-like obstructions 26 are mounted on the top of the highest aerators 9.

If the waters of the stream where the aerators 9 are installed freeze in winter, the said box-like obstructions 26 can be filled with water, by means of suitable inlets and outlets, not shown, which have been provided in said box-like obstructions 26, said obstructions 26 in being mounted on the aerators 9 by means of suitable hinges 27, so that by releasing the anchorage cables, said obstructions 26 will then lie flat on the top of the aerators 9, where, at proper time, in the spring, they would be emptied of their water by means of compressed air, and re-hooked in place.

Similarly, below the floating dam, obstructions 28 could be provided.

In FIGURE 8, we show the anchorage as suitable small pillars in rock, and convenient cables 30. Large blocks of concrete, not shown, might, at places, be used instead of the said pillars.

The elements of the floating dam, the series of aerators 9 should float. The pillars 29 immediately adjacent to the lowest aerators 9 of the dam have for main purpose, beside the anchorage, to eliminate vertical oscillations of the dam as a whole.

If all the pipe-like elements as 23 in FIGURE 7 are prefabricated and similar, and all the end plates 24 are equally similar, as the working widths of the slots 13 will vary in width with depth, this variation in width could easily be made by having (a) thicker wear plates in said slots 13, or (b) having thicker air injectors 12.

The floating dam as constituted by a series of aerators 9, will greatly help to regularize the speed of the flow of the waters at all levels.

I have here described a preferred form of stream aerators, but it is understood that other forms can be resorted to in practice, i.e., true venturis could be used, the air ejectors could be emplaced somewhat before the slot 13, etc.

The embodiments of the invention in which an exclusive property or privilege is claimed are defined as follows:

1. In a steam aerator, a series of components comprising: an open conduit through which the waters of the stream can flow, said conduit being made of two main components, held together by suitable end plates, the said components being pipe like, and having, facing each other, internal surfaces which, from the entry side of the waters in said conduit, gradually with suitable shaped profiles converge together into a horizontal slot or throat of given width, and gradually again, with shaped profiles, gradually diverge to the exit end of the waters of said conduit, like in a venturi, and having in the said slot a horizontal properly shaped pipe serving as an air ejector, said pipe being, by means of other convenient pipes, connected to the atmosphere, so that the waters entering the aerator in reaching a given speed in said slot will create a vacuum which will suck air from the said ejector, said air being then exited with the waters at a certain depth, thereby producing an aeration of the stream waters.

2. A stream water aerator comprising a longitudinally open conduit made of two similar components, pipe like, in which, the said conduit proper is constituted, inside, by the faces of said components, which faces gradually and with a given profile, converge together into a horizontal slot, and similarly then diverge towards the exixt of the said conduit, so that the waters entering the said conduit gradually increase in speed, to a maximum in the said slot, and then gradually diminish in speed towards the exit, like in a venturi, and having, properly located in the said slot, a profiled tube, on which tube, on the exit side of the aerator, are a series of equally spaced holes, said profiled tube or air ejector being by proper means connected to the atmosphere, so that the vacuum created by the speeding waters in the said slot, will draw air from the ejector, which air will be exited with the waters from the aerator, thereby causing the aeration of the waters of the stream in which the said aerator is located.

3. A stream water aerator as defined in claim 2 above, in which at the top end of the exit of the said aerator, a light horizontal cantilever apron is added, so that the air exited from the aerator proper is made to travel under the said apron, thereby causing the air to be in longer contact with the waters, and therefore producing a better aeration of the stream waters.

4. In a stream water aerator, a series of components comprising (a) a conduit of convenient length made of two similar parts facing each other, pipe like, with convenient surfaces on the outside, and with inside surfaces constituting the conduit proper, gradually converging with a suitable profile into a horizontal slot, and then gradually diverging with equally suitable profiles towards the exit end of the said aerator, like in a venturi, and (b), located conveniently in said slot, a horizontal and properly shaped air ejector, said ejector having a series of equally spaced air holes facing towards the exit end of the aerator proper, and (c) suitable connections by convenient ducts from said ejector to the atmosphere so that (d) the rapid flow of the waters in the said slot, in creating a vacuum on the exit side of the air ejector, atmospheric air will be ejected by the said ejector in the exiting waters, thereby producing the aeration of the said stream waters.

5. A stream water aerator as described in claim 4 above, in which, at the top of the exit end of the aerator, there is a light cantilever apron lying horizontally, and with its underside corrugated, so that the exiting air will be in longer contact with the waters, thereby causing a better aeration of the waters of the stream.

References Cited

UNITED STATES PATENTS

| | | | |
|---|---|---|---|
| 1,324,135 | 12/1919 | Sunderman | 261—76 |
| 1,901,806 | 3/1933 | Fulton | 261—76 X |
| 2,585,205 | 2/1952 | Young | 261—76 |
| 3,143,401 | 8/1964 | Lambrecht | 261—76 X |
| 3,336,016 | 8/1967 | Schreiber | 210—220 X |

FOREIGN PATENTS

| | | |
|---|---|---|
| 1,377,571 | 9/1964 | France. |
| 108,647 | 2/1925 | Switzerland. |

TIM R. MILES, Primary Examiner

U.S. Cl. X.R.

261—76, 123; 210—170, 220; 61—1, 19